No. 895,045. PATENTED AUG. 4, 1908.
P. RUDOLPH.
PHOTOGRAPHIC OBJECTIVE.
APPLICATION FILED JULY 12, 1907.
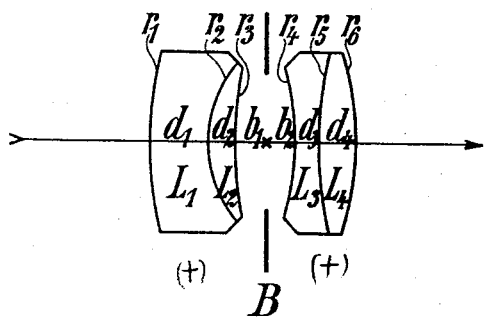
Witnesses—
Inventor—
Paul Rudolph

UNITED STATES PATENT OFFICE.

PAUL RUDOLPH, OF JENA, GERMANY, ASSIGNOR TO THE FIRM OF CARL ZEISS, OF JENA, GERMANY.

PHOTOGRAPHIC OBJECTIVE.

No. 895,045.     Specification of Letters Patent.     Patented Aug. 4, 1908.

Application filed July 12, 1907. Serial No. 383,411.

*To all whom it may concern:*

Be it known that I, PAUL RUDOLPH, doctor of philosophy, a citizen of the German Empire, and residing at Carl-Zeiss strasse, Jena, in the Grand Duchy of Saxe-Weimar, Germany, have invented a new and useful Photographic Objective, of which the following is a specification.

The present invention is an improvement in certain of the Zeiss double objectives described in the patent to Rudolph 444714.

It relates to that kind of objectives, the two components of which consist each of a collective lens and a dispersive lens, both lenses being cemented together, in the one component a dispersive cemented surface presenting its concavity towards the diaphragm, in the other component a collective cemented surface presenting its convexity towards the diaphragm, while in both components, or only in that one with the dispersive cemented surface, the dispersive lens has higher relative dispersion than the collective lens.

This improvement consists in this, that the collective lens, which appertains to the dispersive cemented surface, is produced from a glass of relatively high refractive index, that is to say, one whose refractive index amounts to at least 1.54, consequently the height of the index should at least be that of a light flint glass. In all former constructions according to the said specification 444714 a glass of very low refractive index has been made use of for this collective lens, in order to obtain an especially large difference between the refractive indices at the dispersive cemented surface. Investigations, upon which the present invention is based, have, however, shown that the important point for the correction is not so much this difference but rather the height of the index of the collective lens.

The advantage of the new objective consists in, that relatively large apertures or small zones of spherical aberration or satisfactory flatness of field can be obtained. This effect of the present improvement is independent of whether the component possessing the collective cemented surface is composed of two or three lenses.

The annexed drawing shows an unsymmetrical double objective, in which the invention is realized.

In the two following examples of double objectives according to the present invention the relative aperture is 1:12.5. The radii, thicknesses and distances refer to a focal length 100. The kinds of glass are characterized by the refractive indices $n_D$ and $n_G'$, of which $n_D$ relates to the D-line of the solar and $n_G'$ to the H$\gamma$-line of the hydrogen spectrum. The relative dispersion is determined by the expression $$\frac{n_G' - n_D}{n_D - 1}$$

Example 1 (represented in the drawing:) It is only in the component with the dispersive cemented surface, that the dispersive lens has higher relative dispersion than the collective lens.

*Radii, thicknesses and distances.*

| | | |
|---|---|---|
| $r_1=$ +17.5 | $d_1=$ 2.9 | |
| $r_2=$ + 5.8 | $d_2=$ 1.3 | |
| $r_3=$ +18.6 | $b_1=b_2=$1.5 | |
| $r_4=$ −12.8 | $d_3=$ 1.1 | |
| $r_5=$ +18.6 | $d_4=$ 1.8 | |
| $r_6=$ −14.3 | | |

*Kinds of glass.*

| | $n_D$ | $n_G$ | $\frac{n_G'-n_D}{n_D-1}$ |
|---|---|---|---|
| $L_1$: | 1.6489 | 1.6744 | 0.0393 |
| $L_2$: | 1.6031 | 1.6239 | 0.0345 |
| $L_3$: | 1.5154 | 1.5275 | 0.0235 |
| $L_4$: | 1.6112 | 1.6260 | 0.0242 |

Example 2: In both components the dispersive lens has higher relative dispersion than the collective lens.

*Radii, thicknesses and distances.*

| | | |
|---|---|---|
| $r_1=$ +16.3 | $d_1=$ 2.8 | |
| $r_2=$ + 6.5 | $d_2=$ 1.86 | |
| $r_3=$ +17.2 | $b_1=b_2=$1.4 | |
| $r_4=$ −18.6 | $d_3=$ 1.4 | |
| $r_5=$ +24.2 | $d_4=$ 1.86 | |
| $r_6=$ −20.4 | | |

*Kinds of glass.*

| | $n_D$ | $n_G'$ | $\frac{n_G'-n_D}{n_D-1}$ |
|---|---|---|---|
| Dispersive lens $L_1$: | 1.6042 | 1.6222 | 0.0298 |
| Collective lens $L_2$: | 1.5639 | 1.5778 | 0.0247 |
| Dispersive lens $L_3$: | 1.5101 | 1.5211 | 0.0216 |
| Collective lens $L_4$: | 1.6211 | 1.6341 | 0.0209 |

I claim:

1. Unsymmetrical double objective, one component of which consists of a collective lens and a dispersive lens cemented together, the collective lens having the lower relative dispersion and the dispersive lens the higher one, the cemented surface being dispersive and presenting its concavity towards the diaphragm, and the refractive index of the collective lens amounting to at least 1.54, and the other component of which includes a collective cemented surface convex towards the diaphragm.

2. Objective of two components, each consisting of a collective lens and a dispersive lens cemented together, one component having a collective cemented surface convex towards the diaphragm, the other component having a dispersive cemented surface concave towards the diaphragm, and the collective lens of this other component having a refractive index of at least 1.54 and a relative dispersion which is lower than that of the dispersive lens of the same component.

PAUL RUDOLPH.

Witnesses:
 PAUL KRÜGER,
 FRITZ SANDER.